Sept. 24, 1968  E. S. STEVENS  3,402,971
APPARATUS FOR FLUIDIZING BULK MATERIALS
Filed April 25, 1966  4 Sheets-Sheet 1

INVENTOR.
ERIC S. STEVENS
BY Eugene N. Riddle
ATTORNEY

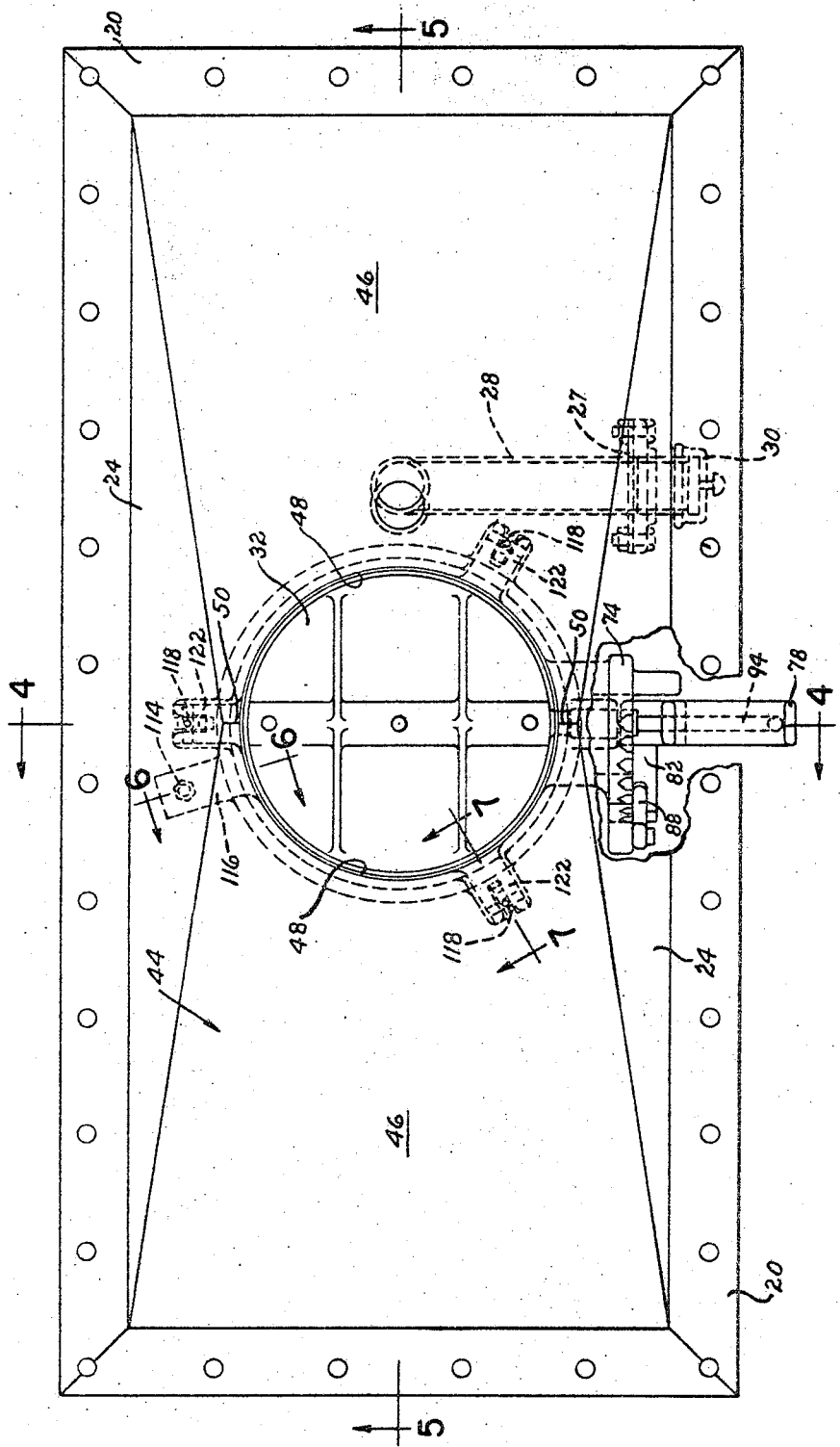

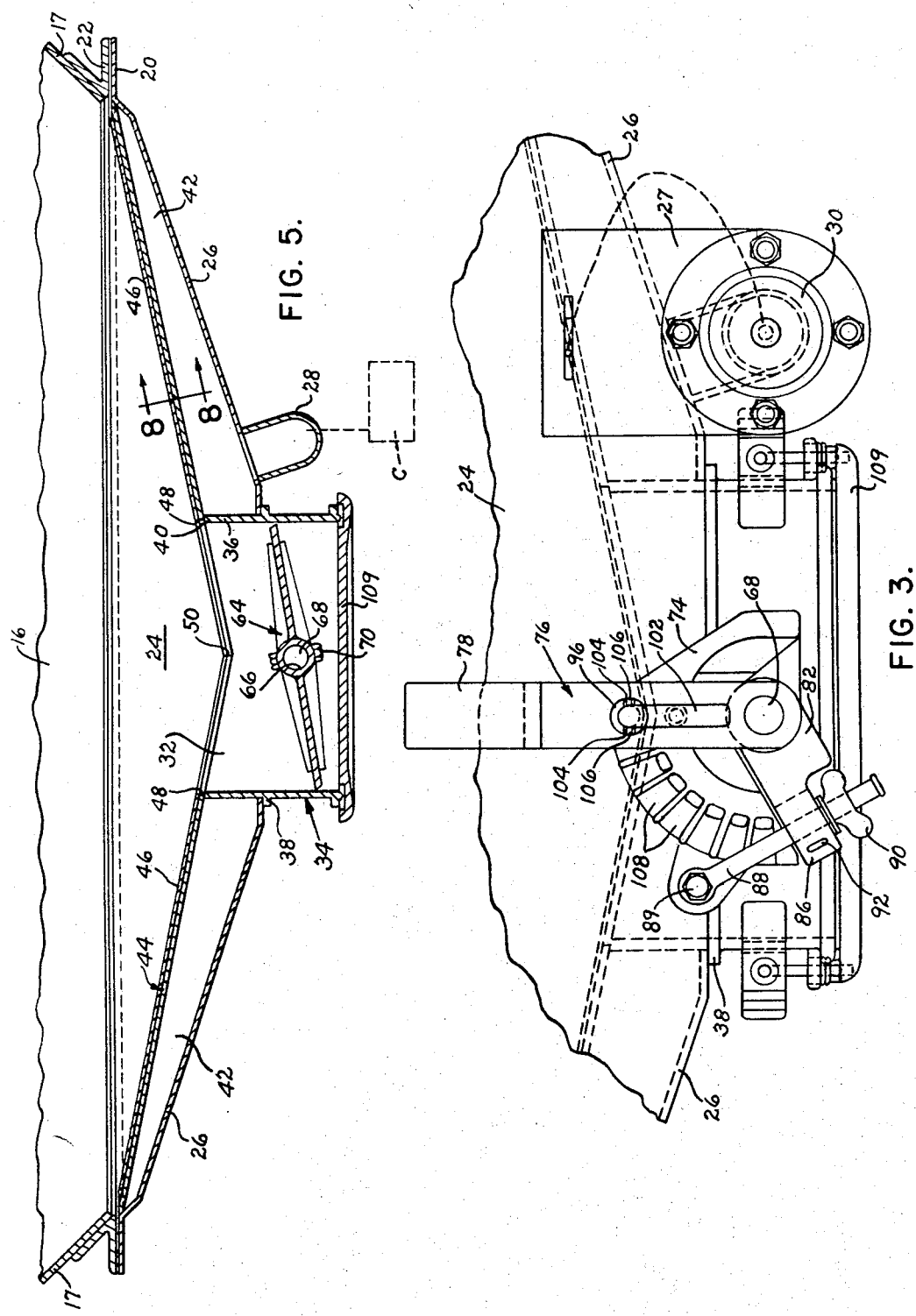

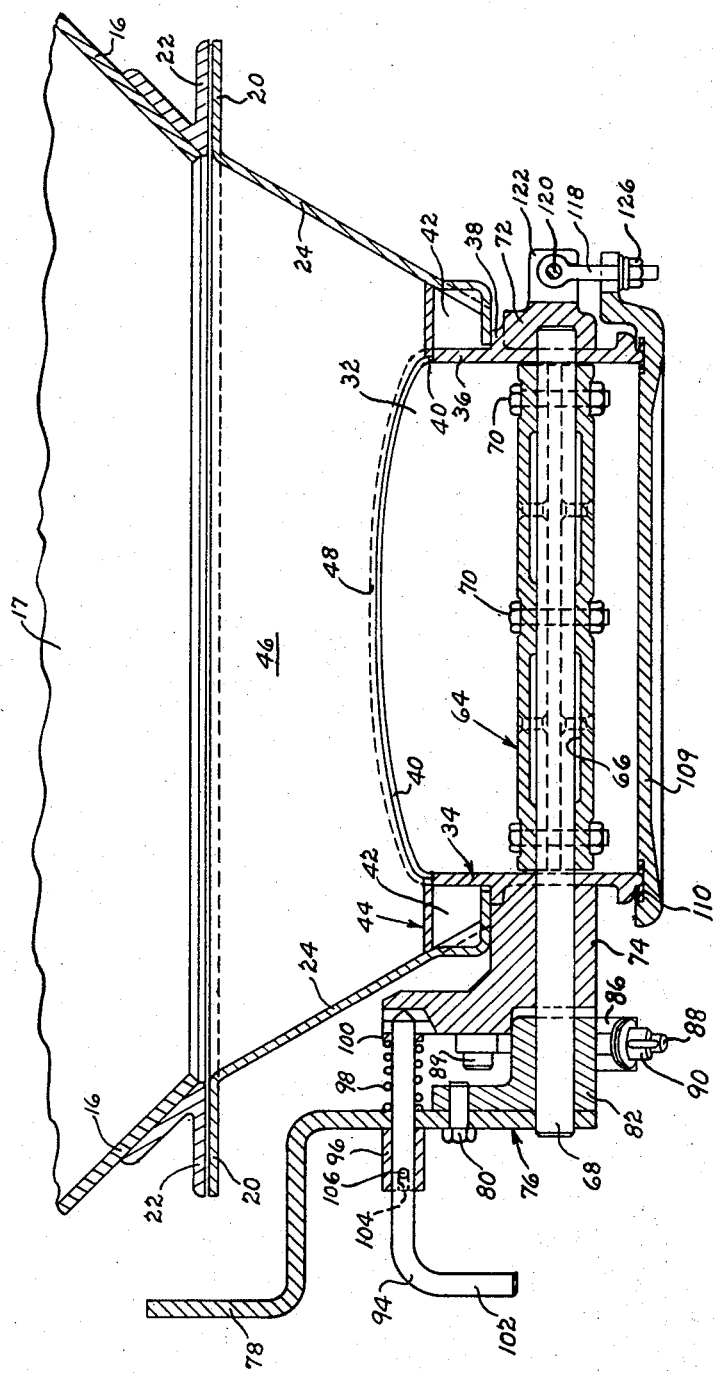

United States Patent Office 3,402,971
Patented Sept. 24, 1968

3,402,971
APPARATUS FOR FLUIDIZING BULK MATERIALS
Eric S. Stevens, St. Charles, Mo., assignor to ACF Industries, Incorporated, New York, N.Y., a corporation of New Jersey
Filed Apr. 25, 1966, Ser. No. 545,078
4 Claims. (Cl. 302—52)

ABSTRACT OF THE DISCLOSURE

A hopper outlet for fluidizing or aerating granular or pulverulent materials and having a pair of opposed bottom walls connected to a pair of opposed side walls with the side walls being of a relatively steep slope and the bottom walls being of a relatively shallow slope. A vertically extending tubular discharge conduit defines a central opening for the outlet and has a butterfly valve mounted therein for controlling the flow of lading from the hopper outlet. A fluid permeable member is secured over the bottom walls between the side walls and extends about the entire periphery of the tubular conduit to form a plenum chamber thereabout.

Background of the invention

Heretofore, butterfly valves or rotatable disks have been employed within discharge conduits to control the flow of lading from the conduits. At times, particularly with pulverulent materials, such as carbon black or cement, the materials have tended to bridge over the entrance to the discharge conduit. Further, a high turning torque has been required to turn or rotate the butterfly valve heretofore, especially under a full load of lading.

Decription of the invention

The present invention is especially directed to a bottom outlet structure in which a butterfly valve is positioned within a tubular discharge conduit with the area immediately above and surrounding the discharge conduit being fluidized or aerated. The butterfly valve is positioned closely adjacent the upper end of the discharge conduit so that the material is completely fluidized or aerated when it reaches the butterfly valve. This arrangement permits the bottom of an outlet leading to the tubular discharge conduit to have a relatively small slope and yet to discharge in a minimum of time. As the material is fluidized when it reaches the butterfly valve, only a minimum torque is required to turn the valve and overcome the resistance of the lading. Thus, no gear unit or other power multiplying device is needed to open the butterfly valve comprising the present invention.

To maintain the butterfly valve in a closed position in transit and prevent tampering with the valve, a suitable swing bolt may be provided to engage a lug adjacent the handle and draw the valve into a tight closed position. A suitable seal may be employed so that the valve may not be operated without breaking the seal. Another feature includes a cover over the lower end of the discharge conduit to prevent the entry of foreign matter and the like within the conduit during transit. The cover may be easily swung to a position remote from the conduit to permit a discharge of lading.

It is an object of the present invention to provide a discharge outlet employing a butterfly valve which may be easily turned to an open position.

A further object of this invention is the provision of such a discharge outlet which has a minimum of parts and may be easily assembled in a minimum of time.

An additional object of the invention is the provision of an outlet structure in which the lading does not bridge over or span the discharge conduit and in which the lading is completely fluidized or aerated when it reaches the discharge conduit.

The invention accordingly comprises the constructions hereinafter described, the scope of the invention being indicated in the following claims.

In the accompanying drawings, in which one of various possible embodiments of the invention is illustrated, FIGURE 1 is a side elevation of a railway car having a plurality of bottom outlet structures of the present invention mounted thereon;

FIGURE 2 is a top plan view of one of the bottom outlet structures of FIGURE 1 shown removed from the railway car;

FIGURE 3 is a fragmentary side elevation of the outlet structure of FIGURE 2;

FIGURE 4 is a section taken generally along line 4—4 of FIGURE 2;

FIGURE 5 is a section taken generally along line 5—5 of FIGURE 2;

Corresponding reference characters indicate corresponding parts throughout the several views of the drawings.

Figure 1:
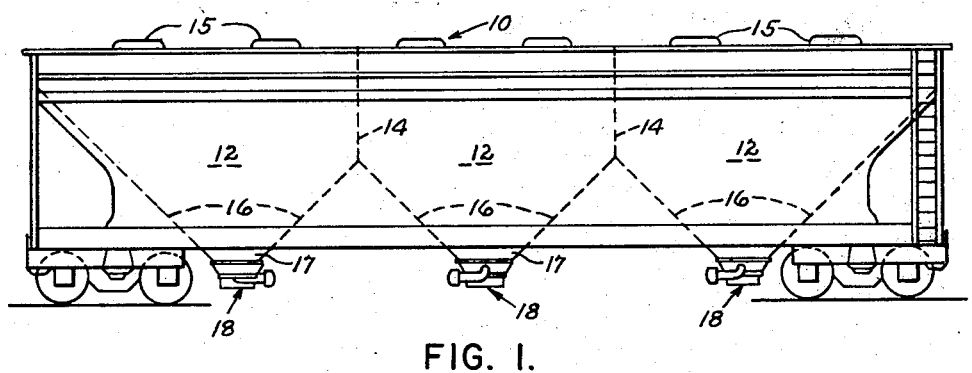

Referring now to the drawings for a better understanding of this invention and more particularly to FIGURE 1, a covered railway car is generally designated 10 and has a plurality of hoppers generally designated 12 separated by partitions 14. Hoppers 12 are loaded from hatch covers 15. Hopper slope sheets 16 and 17 slope downwardly to bottom outlet structures generally designated 18 and comprising the present invention.

Each bottom outlet structure 18 has an upper peripheral flange 20 adapted to fit against and to be secured to a superjacent corresponding flange 22 for securing the bottom outlet structure, such as by welding or a plurality of bolts. Each bottom outlet structure 18 is generally identical and comprises outlet walls or slope sheets 24 and 26 connected to each other. Outlet walls 24 slope downwardly from flange 20 at a relatively steep slope of over around 60° with respect to a horizontal plane to form side walls. Outlet walls 26 form bottom walls which slope downwardly from flange 20 at an angle less than thirty degrees with respect to a horizontal plane. Mounted on a bracket 27 extending from the underside of one of the walls 26 is an air inlet pipe 28 which is adapted to be connected to a suitable source of air, such as an air compressor C, at an unloading site for the unloading of lading. A removable end cap 30 may be suitably threaded on the end of air inlet pipe 28.

Side and bottom walls 24 and 26 slope downwardly to a central discharge opening 32 in bottom walls 26. Forming discharge opening 32 is a tubular discharge conduit generally designated 34 and having a rim 36 projecting upwardly within bottom outlet structure above bottom walls 26 and spaced inwardly from adjacent side walls 24. Conduit 34 is generally cylindrical and has its longitudinal axis extending in a generally vertical direction. A peripheral flange 38 on discharge conduit 34 extends beneath and is secured to bottom walls 26. Secured to the upper edge 40 of rim 36 to form a plenum chamber 42 with walls 24, 26 and rim 36 is a fluid permeable load bearing structural member generally designated 44. Fluid permeable member 44 comprises a pair of sections or portions designated 46 each having a portion cut out at 48 to receive tubular conduit 34. Sections 46 join each other at 50 and form plenum chamber 42 about the entire periphery of conduit 34 since fluid permeable member 44 extends about the entire periphery of conduit 34 over bottom walls 26 and between side walls 24.

Figure 8:
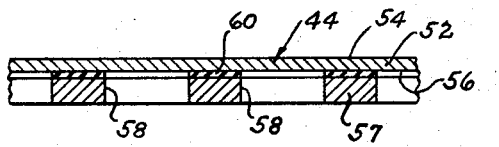
FIGURE 8 is a section taken generally along line 8—8 of FIGURE 5 and showing the fluid permeable member.

Referring to FIGURE 8, permeable member 44 includes an upper permeable sheet 52 having generally parallel faces 54 and 56. Upper face 54 forms a material supporting surface, the material to be unloaded being supported on face 54 moving therealong to opening 32 for discharge. Permeable sheet 52 is formed of a fiber metal material in which metallic fibers, such as stainless steel fibers, are individually dispersed and felted to form a random, interlocked non-woven body which is sintered under reducing conditions at a high temperature to produce welds at interfiber contact points. A suitable material for sheet 52 is manufactured and sold under the name "Feltmetal" by Huyck Metals Division of Huyck Corporation, 45 Woodmont Road, Milford, Conn.

As permeable member 44 has a relatively large unsupported dimension between walls 24 and 26, the weight of the material or lading supported thereon forms a substantial dead load on permeable member 44 during transit. A rigid perforated plate or base 57 is secured to sheet 52 and is generally coextensive with sheet 52. Perforations 58 extend through plate 57 and may comprise around 60% of the entire surface area of the plate. To secure sheet 52 to plate 57, a layer of thermoactive adhesive 60 is first smeared on a face of plate 57 and sheet 52 is then pressed into contact with plate 57. An adhesive which has been found to be satisfactory for bonding sheet 52 to plate 57 is adhesive EC-2214 produced by Minnesota Mining and Manufacturing Company, Adhesives, Coatings, and Sealers Division, 900 Bush Avenue, St. Paul 6, Minn.

A permeability of around ten (10) for permeable member 44 has been found to be satisfactory for handling finely-divided particles. This rating may be obtained by employing a metallic sheet 52 of around one-sixteenth ($1/16$) inch in thickness with perforations and a steel plate 57 of around one-eighth ($1/8$) inch in thickness with apertures or perforations 58 comprising around 60% of the entire surface area. For further details of permeable member 44, reference is made to Patent No. 3,237,812, issued Mar. 1, 1966, to W. E. Kemp and entitled "Apparatus for Handling Bulk Materials," the entire disclosure of which is incorporated by this reference.

It is to be understood that any suitable permeable material may be employed as a fluid permeable member if having sufficient rigidity to support a full load of lading within hopper 12 and providing a suitable permeability.

To fluidize the material above permeable member 44, air under pressure from an air compressor C to plenum chamber 42 through inlet pipe 28 at an air pressure of around 5 p.s.i. will effect an air flow into the mass of material supported on the surface of permeable member 44. The air flow will be about the entire periphery of rim 36 of conduit 34. Each section 46 of fluid permeable member 44 is substantially flat and may be welded to the upper edge 40 of rim 36 and between side walls 24 over bottom walls 26 for forming plenum chamber 42. The outer edges of sections 46 are secured to bottom walls 26.

Mounted within conduit 34 is a butterfly valve 64 comprising a circular disk having a tubular opening 66 receiving an operating shaft 68 and secured thereto by bolts 70. An end bearing 72 is secured to conduit 34 immediately below plenum chamber 42 and supports an end of operating shaft 28. An opposed bearing 74 is likewise secured to conduit 34 immediately below plenum chamber 42 to support shaft 68. A handle 76 has a grip 78 on the extending end thereof. Handle 76 is mounted about an end of operating shaft 68 and is secured by bolt 80 to a sleeve or lug 82 secured on shaft 68. Lug 82 has a bifurcated extension 86 as shown in FIGURE 3 and is adapted to receive a swing bolt 88 pivotally secured at 89 to an extension of bearing 74. A wing nut 90 may be threaded on swing bolt 88 to be drawn tight against bifurcation 86 to retain operating shaft 68 and butterfly valve 64 in a closed position. A seal (not shown) may be inserted through opening 92 in bifurcation 86 to prevent removal of swing bolt 88 from the bifurcation without removal of the seal. Thus, tampering and inadvertent opening of butterfly valve 64 are prevented.

To vary the degree or amount of opening of butterfly valve 64, a pin 94 slidably fits within a sleeve 96 on handle 76. A spring 98 is biased between a washer 100 secured to pin 94 and the adjacent face of handle 76 to urge pin 94 in an inward direction with relation to butterfly valve 64. Pin 94 has a handle 102 which may be gripped for manipulation. Slots 104 in sleeve 96 receive detents 106 extending from pin 94 to prevent rotation of pin 94 and to permit pin 94 to be withdrawn and held in a released position until valve 64 has been properly positioned. Bearing 74 has a plurality of indentations or grooves 108 which are adapted to receive the projecting end of handle 94 to position valve 64 at a predetermined position.

To open valve 64 from the position shown in FIGURE 4, wing nut 90 may be loosened and swing bolt 88 withdrawn to an open position removed from bifurcation 86. Handle 102 is then gripped to withdraw pin 94 from its seated position within one of the grooves 108 and may be slightly rotated when withdrawn to permit detents 106 to engage the outer face of sleeve 96 to hold pin 94 in a withdrawn position until valve 64 has been properly positioned. Valve 64 is rotated by handle 76 to a desired position. Then, handle 102 may be gripped and rotated to align detents 106 with slots 104 thereby permitting pin 94 to seat within the selected groove 108.

Figure 7:
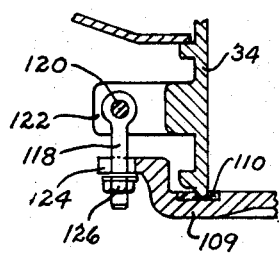
FIGURE 7 is a section taken generally along line 7—7 of FIGURE 2 and illustrating the releasable securing means for the bottom cover.
Figure 6:
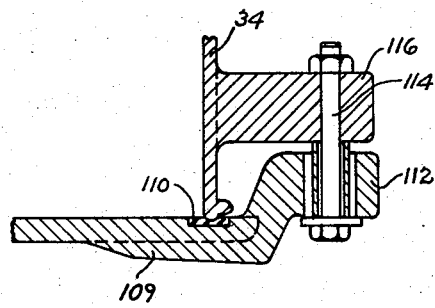
FIGURE 6 is a section taken generally along line 6—6 of FIGURE 2 and illustrating the pivotal mounting of the bottom cover.

To cover the lower end of conduit 34 for preventing the entry of foreign matter and the like, a cover 109 has a gasket 110 engaging the lower edge of conduit 34. Referring to FIGURE 6, cover 109 has an extension 112 which receives a pivot bolt 114. A lug 116 extending from conduit 34 pivotally supports bolt 114. To secure cover 109, a plurality of swing bolts 118 are pivotally mounted at 120 to lugs 122 projecting from conduit 34 as shown in FIGURE 7. Bolts 118 are received within extensions 124 on cover 109 and nuts 126 draw cover 109 tight against the adjacent edge of conduit 34. To swing cover 109 to a position for unloading, nuts 126 are loosened to permit swing bolts 118 to be swung to an inoperable position. Then, cover 109 is rotated about pivot pin 114 to a position removed from the lower edge of conduit 34. In this position, valve 64 may be moved to an open position for discharge of material from the bottom outlet structure.

From the foregoing, it will be understood that a butterfly valve has been provided in which the area immediately above the butterfly valve is fluidized about the entire periphery of the discharge conduit in which the butterfly valve is mounted so that the butterfly valve may be easily moved to an open position for discharge of lading without the use of a gear mechanism or other power multiplying device. The bridging over or spanning of the discharge conduit by lading which has been common heretofore is eliminated by the present invention as the material about the entire periphery of the discharge conduit is fluidized or aerated. The butterfly valve is easily locked in a closed position and may be easily moved to a predetermined angular relation for suitable discharge of the lading. The outlet structure comprises a minimum of parts and may be fabricated in a minimum of time with a minimum of labor.

In view of the above, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A bottom outlet structure adapted to be secured beneath a hopper, said outlet structure comprising a plurality of connected walls funneling downwardly to a generally central opening, said connected walls including a pair of opposed bottom walls connected to a pair of opposed side walls, said side walls being of a relatively steep slope with respect to the horizontal and said bottom walls being of a relatively small slope with respect to the horizontal, a tubular discharge conduit defining said central opening and extending axially in a generally vertical direction, a butterfly valve mounted within said discharge conduit, means to rotate said butterfly valve for controlling the particle flow from the hopper, said discharge conduit having an upper rim projecting upwardly within said outlet structure and forming a plenum chamber between the rim and the outlet walls which extends about substantially the entire periphery of the discharge conduit, said plenum chamber being defined by a fluid permeable load bearing structural member secured over the bottom walls between the rim and adjacent side walls, said load bearing structural member comprising a pair of downwardly sloping oppositely facing sections extending about said tubular conduit and sloping downwardly toward the tubular conduit at a generally uniform rate and at a relatively small angle with respect to the horizontal thereby to form a relatively smooth particle supporting surface, an operating shaft immediately below said plenum chamber on which said butterfly valve is secured, means supporting the shaft for rotation about a generally horizontally extending axis, means to releasably lock the shaft and butterfly valve in a closed position thereof, means to releasably set the butterfly valve at a predetermined open position, and means to releasably cover the lower end of said tubular conduit.

2. A bottom outlet structure as set forth in claim 1 wherein said load bearing structural member comprises a permeable sheet having two spaced parallel faces with one of said faces forming the particle supporting surface, a perforated substantially rigid plate generally coextensive with and adjacent the other of said faces of said sheet, and a layer of adhesive interposed between the sheet and said plate to secure the plate and sheet to each other and to form an integrally bonded rigid sandwich.

3. A bottom outlet structure as set forth in claim 1 wherein said means to releasably set the butterfly valve at a predetermined open position comprises a handle secured to said shaft for rotating said butterfly valve, a spring mounted pin carried by said handle and urged in an inward direction toward the butterfly valve, and a plurality of indentations on said outlet structure adjacent the inner end of said pin and adapted to receive selectively said inner end to prevent rotational movement of said handle when said pin is received within the selected indentation.

4. A bottom outlet structure as set forth in claim 1 wherein said means to releasably cover the lower end of said tubular conduit comprises a cover mounted adjacent its periphery for pivotal movement about a vertical axis whereby the cover may be pivoted to a position remote from the lower end of the tubular conduit, and a plurality of swing bolts mounted on said conduit for pivotal movement and adapted to engage said cover to secure said cover in a closed position.

References Cited

UNITED STATES PATENTS

| 3,069,208 | 12/1962 | Green et al. | 302—52 |
| 3,322,469 | 5/1967 | Fritz | 302—52 |

FOREIGN PATENTS

| 1,330,566 | 5/1963 | Germany. |

ANDRES H. NIELSEN, *Primary Examiner.*